(12) United States Patent
Shao et al.

(10) Patent No.: US 8,234,284 B2
(45) Date of Patent: Jul. 31, 2012

(54) METHOD AND SYSTEM FOR SORTING INTERNET MUSIC FILES, SEARCHING METHOD AND SEARCHING ENGINE

(75) Inventors: Rongfang Shao, Shenzhen (CN); Zhiping Wang, Shenzhen (CN); Ying Xiong, Shenzhen (CN); Yang Guo, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 209 days.

(21) Appl. No.: 12/676,543

(22) PCT Filed: Sep. 4, 2008

(86) PCT No.: PCT/CN2008/072264
§ 371 (c)(1),
(2), (4) Date: Mar. 4, 2010

(87) PCT Pub. No.: WO2009/033408
PCT Pub. Date: Mar. 19, 2009

(65) Prior Publication Data
US 2010/0185607 A1    Jul. 22, 2010

(30) Foreign Application Priority Data
Sep. 6, 2007  (CN) .......................... 2007 1 0145627

(51) Int. Cl.
*G06F 17/30* (2006.01)
(52) U.S. Cl. ......... 707/748; 707/737; 707/723; 707/752
(58) Field of Classification Search ................. 707/723, 707/752, 748, 749, 737
See application file for complete search history.

(56) References Cited

U.S. PATENT DOCUMENTS

| | | | |
|---|---|---|---|
| 7,082,434 B2* | 7/2006 | Gosselin | 707/999.001 |
| 7,396,127 B2* | 7/2008 | Bae et al. | 351/200 |
| 7,536,303 B2* | 5/2009 | Yoshizawa et al. | 704/231 |
| 2003/0093422 A1* | 5/2003 | Yamamoto et al. | 707/3 |
| 2004/0133480 A1* | 7/2004 | Domes | 705/26 |
| 2006/0004893 A1 | 1/2006 | Miyazawa et al. | |
| 2007/0088862 A1* | 4/2007 | Burkman et al. | 710/16 |
| 2007/0208990 A1* | 9/2007 | Kim et al. | 715/500.1 |
| 2007/0233743 A1* | 10/2007 | Rosenberg | 707/104.1 |
| 2008/0110322 A1* | 5/2008 | Lee et al. | 84/611 |
| 2008/0190269 A1* | 8/2008 | Eom et al. | 84/611 |
| 2009/0063983 A1* | 3/2009 | Amidon et al. | 715/733 |
| 2009/0071315 A1* | 3/2009 | Fortuna | 84/609 |

FOREIGN PATENT DOCUMENTS

| | | |
|---|---|---|
| CN | 1716254 A | 1/2006 |
| CN | 1932819 A | 3/2007 |
| CN | 101105815 A | 1/2008 |

OTHER PUBLICATIONS

International Search Report for PCT/CN2008/072264 ISA/CN mailed Dec. 11, 2008.

* cited by examiner

*Primary Examiner* — Rehana Perveen
*Assistant Examiner* — Tiffany Thu Bui (57) ABSTRACT

Embodiments of the present invention provide a method and system for sorting Internet music files, a searching method and a searching engine. The method for sorting Internet music file includes: calculating text correlation and value correlation of each of music files; calculating comprehensive correlation of each of the music files according to the text correlation and the value correlation; and sorting the music files according to the comprehensive correlation. Embodiments of the present invention are to show the user music files possessing relatively good correlation with the searching request of the user.

8 Claims, 2 Drawing Sheets

METHOD AND SYSTEM FOR SORTING INTERNET MUSIC FILES, SEARCHING METHOD AND SEARCHING ENGINE

The application claims the benefit of Chinese Patent Application No. 200710145627.6 filed on Sep. 6, 2007, and entitled "Method and System for sorting Internet music files, Searching Method and Searching Engine". The disclosure of the above application is incorporated herein by reference.

TECHNICAL FIELD

The invention relates to Internet searching technologies, and more particularly, to a method and a system for sorting Internet music files, a searching method and a searching engine.

BACKGROUND OF THE INVENTION

Searching engine technologies are very popular in recent years. Technologies based on the searching engine technologies, such as web searching technologies, news searching technologies, multimedia files searching technologies and map searching technologies, etc. have great practical values and commercial values. At present, various searching engine technologies are emerging, and various searching applications related to the searching engine technologies also develop rapidly.

Generally speaking, multimedia file searching includes music file searching, video file searching and picture file searching, etc. The video file searching engine based on the searching technologies performs searching, provides information searching about video files of various formats, such as RM, WMV, and downloads Unified Resource Locators (URLs). The picture file searching engine based on the searching technologies, performs searching, provides information searching about image files of Joint Photo Graphic Expert Group (JPEG) and other formats and downloads the URL. The music file searching engine generally called as Mp3 searching engine and based on the searching technologies, performs searching, provides information searching of music files of MP3 or other formats, and downloads the URL.

The music searching engine is a kind of Internet service, which provides a convenient searching entry for users through browser. A user may find URL source of musics that the user wants to download/listen to through the music searching engine. Generally, a user constructs one or multiple searching key words according to songs that the user want to find, and then sends a searching request including the searching key words to a web entry of the music searching engine. The music searching engine performs searching according to the searching key words inputted by the user, finds music URL source records matching with the searching key words of the user, sorts the searching results and returns the URL searching records to the user page by page.

With continuous mature of searching technologies, and increase of requirements for downloading multimedia files of Internet users, competition of music searching engines is more and more intense in recent years, meanwhile the technology develops faster and faster. Therefore, in addition to increase number of searching results (e.g., increase number of links to music files, reduce dead links, etc), the qualities of searching results must also be improved, to provide better experiences to users. It is necessary to sort searching results in the process of searching the music file, while the sorting of the searching results is one of the most crucial parts in the searching experience.

However, in the conventional music file searching technologies, the sorting of searching results is relatively random, consideration about correlation of searching results and searching requests is inadequate, not all factors affecting the searching results are taken into consideration, which is inconvenient for the use of the user.

For example, when sorting the searching results with some conventional searching engines, the problem that songs of one singer emerge repeatedly in adjacent positions is not taken into consideration, while the searching results are simply sorted according to weight of each song. If a user wishes to find an uncommon song, the song cannot be quickly found. For example, when searching the keyword "first time" in a music searching engine, only three different songs of different singers are found in the first three pages of searching results.

Moreover, in the conventional music file searching, there are some drawbacks in tidiness and orderliness of the searching results. For example, the effect of a length factor of a song name in a text correlation weight recorded by music on the searching results of the conventional music searching is not taken into account, which makes the searching results un-tidy. For example, supposing that a user wishes to find a song "Love" sung by XiaoHu Dui and searches for the key word "Love" in a music searching engine, and then the sorting of the searching results is out of order in the text length. The user cannot ensure whether the URL source of the song "Love" exists in the searching engine, and also cannot know how many pages should be turned over before finding the song, which brings inconvenience to usage of the user.

SUMMARY OF THE INVENTION

An embodiment of the present invention provides a method for sorting Internet music files, which may evaluate correlation between music files and the searching request of the user according to correlation factors, and may easily show the music files possessing relatively good correlation with the searching request of the user.

An embodiment of the present invention provides a system for sorting music files, which may evaluate correlation between music files and the searching request of the user according to correlation factors, and may easily show the music files possessing relatively good correlation with the searching request of the user.

An embodiment of the present invention also provides a method for sorting music files, which may search out music files possessing relatively good correlation with the searching request of the user.

An embodiment of the present invention also provides an engine for searching music files, which may search out music files possessing relatively good correlation with the searching request of the user.

Technical solutions provided by embodiments of the present invention are as follows.

A method for sorting Internet music files, includes
calculating text correlation and value correlation of each of music files;
calculating comprehensive correlation of each of the music files according to the text correlation and the value correlation; and
sorting the music files according to the comprehensive correlation.

A method for searching Internet music files, includes
calculating text correlation and value correlation of each of music files;

calculating comprehensive correlation of each of the music files according to the text correlation and the value correlation, and sorting the music files according to the comprehensive correlation;

decomposing a searching string inputted by a user into multiple morphemes;

calculating correlation weights regarding the searching string inputted by the user for all music files meeting a searching request of the user, according to correlation weight data of each specific morpheme and sorting result of the music files;

sorting the music files according to the correlation weights;

returning the sorted music files to the user.

A system for sorting Internet music files, includes a text correlation calculation unit, configured to calculate text correlation of each of music files;

a value correlation calculation unit, configured to calculate value correlation of each of the music files; and a sorting unit, configured to calculation comprehensive correlation of each of the music files according to the text correlation and the value correlation of each of the music files, and sort the music files according to the comprehensive correlation.

An engine for searching Internet music files, including:

a reptile, configured to obtain Internet music files from the Internet, and send text fields and value factors of the Internet music files to an indexing system;

the indexing system, configured to calculate text correlation between a specific morpheme and each of the music files, according to hit probability of the specific morpheme in the text fields of the Internet music files, calculate value correlation of each of the music files according to the value factor and weight of each of the music files, calculate comprehensive correlation between the specific morpheme and each of the music files, according to the text correlation between the specific morpheme and each of the music files and the value correlation of each of the music files, and sort the music files regarding the specific morpheme according to the comprehensive correlation;

a searcher, configured to decompose a searching string inputted by a user into multiple specific morphemes, calculate correlation weights regarding the searching string inputted by the user for all music files meeting a searching request of the user, according to correlation weight data of each specific morpheme and sorting result regarding each specific morpheme, and sort the music files meeting the searching request of the user according to the correlation weights, and return the sorted music files to the user.

Seen from the above technical solution, embodiments of the present invention calculate the text correlation and value correlation of the music files, and then calculate the comprehensive correlation of the music files, and finally sort the music files regarding specific morpheme according to the comprehensive correlation. Thus, it can be seen that in accordance with embodiments of the present invention, correlation sorting is performed for the searching results of the music searching engine according to the factors, such as the text attributes and value attributes of the Internet music files, subsequently music files possessing relatively good correlation with the searching request of the user may be presented for the user more easily, meanwhile the effect of the correlation sorting of the music searching engine may be improved and the sorting of the searching results may better satisfy the requirements of the user.

EMBODIMENTS OF THE PRESENT INVENTION

To make objective, technical solution and advantages of the present invention clearer, further detailed descriptions are provided hereinafter accompanying with drawings and embodiments.

In the embodiments of the present invention, the correlation sorting of searching results of the music searching engine is performed according to factors, such as a text attribute and value attribute of Internet music files. The objective is to try to rank URL sources of songs possessing good correlation with the searching request of the user in the front of the searching results of the user.

A user inputs a searching keyword list into a music searching engine to search for a music that the user wishes to listen to or download. The searching results returned by the music searching engine are constituted by multiple music records, each of which includes text information, such as a music source URL, a song name, a singer name, and an album name, etc. If the text information of a music record includes all of the searching keywords submitted by the user, the music record meets the searching request of the user and may be returned as a record of the searching results. During the music searching, number of searching keywords inputted by users is generally very small, thus there may be many music records meeting the searching keywords of the user. They may be different songs of different singers, or even data of different sources URLs of a same song. Some of these music records meeting the searching keywords of the user, are the ones wanted to be searched out by the user, and the others are not related with requirements of the user. Meanwhile, as for different sources of one song of a same singer, attributes of the song (e.g., data file size, encoding rate, downloading rate, connectivity rate, etc.) may also be different.

Thus, embodiments of the present invention define a concept of song quality. Requirement degree of downloading or audition of a user that a song source may meet is called the song quality of the song source. The song quality is obtained by synthetically considering multiple song attributes. Generally speaking, if a song source may be quickly and easily connected to and downloaded by a user, play quality thereof may preferably satisfy the enjoy and audition requirements of the user, and the song quality of the song is considered to be very well. Meanwhile, embodiments of the present invention also define the concept of correlation. If text information of a song source record matches the searching word list submitted by a user well, the play quality of the song is relatively good, and the text correlation between the song and the searching request of the user is relatively good.

As for the searching of the music file, in addition to search out URLs of a multimedia file by the searching engine, generally, it is necessary to provide some additional multimedia file information. For example, the MP3 searching engine generally needs to provide information such as, song names, singer names, album names of MP3 files, apart from URL links of the MP3 files. The integrated and reasonable sorting of the information is a basis of a good music file searching engine.

Searching results of the music searching are sorted according to a correlation value between music file data records and a searching string inputted by the user.

The searching string is decomposed into multiple single-morpheme. Thus, correlation between the searching string and the music file data records is also decomposed into correlations between the multiple single-morpheme and the music file data records. The correlation value between the single-morpheme and a specified document is determined by a series of texts and value attributes (correlation calculation factors) of the music data document. The correlation value has been obtained by calculation when an index is established.

Figure 1:
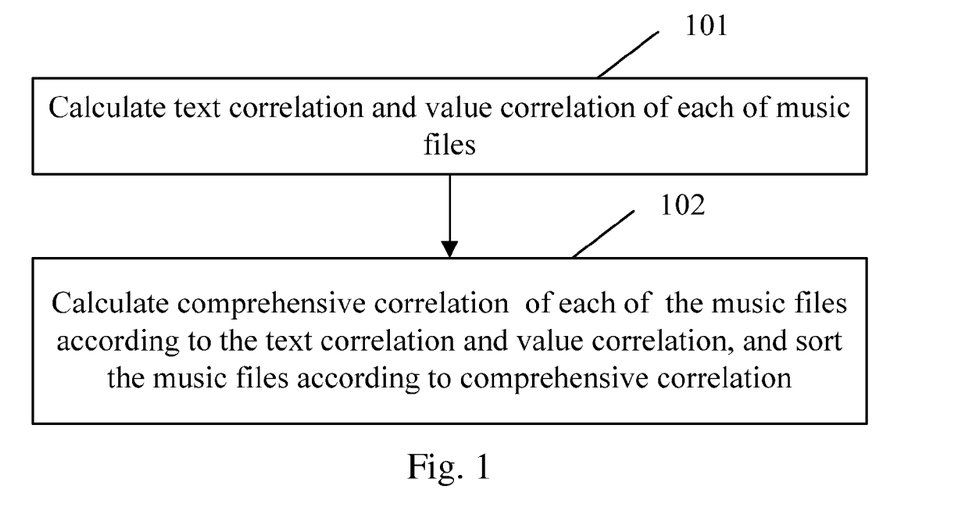
FIG. 1 is a simplified flow schematic diagram illustrating a method for sorting music files in accordance with a first embodiment of the present invention.

FIG. 1 is a flow chart illustrating a method for sorting music files in accordance with an embodiment of the present invention.

The first embodiment 1: As shown in FIG. 1, the method includes the following blocks.

Block 101: Calculate text correlation and value correlation of each of music files.

Thus, the text correlation between a specific morpheme and the each of music files may be calculated according to hit probability of the specific morpheme in a text field of the Internet music files. And then, the value correlation of each of the music files may be calculated according to a value factor and weight of each of the music file.

Alternatively, this method includes first constructing a specific phrase or specific expression with a specific morpheme, and then calculating the text correlation between the specific phrase or specific expression and each of the music file, according to hit probability of the specific phrase or specific expression in the text field of the Internet music files.

The text field may include at least one of, or any combination of a song name, a singer name, an album name and lyrics. And the method for calculating the text correlation between the specific morpheme and each of the music files includes the following operations.

The correlation values between the specific morpheme and the song name, singer name, album name and lyric are respectively multiplied by a weight to obtain products, and then a value obtained by adding each product is taken as the text correlation value.

Alternatively, the correlation values between the specific morpheme and the song name, singer name, album name and lyric are respectively multiplied by a weight thereof to obtained products, each product is added to obtain a value, and then the value is multiplied by a document type coefficient corresponding to a music file type to obtain the text correlation value.

The value of each weight is determined with the following application rules.

When the specific morpheme corresponds to the song searching, the weight of the song name is larger than that of the singer name, the weight of the singer name is larger than that of the album name, and the weight of the album name is larger than that of the lyric.

When the specific morpheme corresponds to the lyric searching, the weight of the song name is larger than that of the lyric, the weight of the lyric is larger than that of the album name, and the weight of the album name is larger than that of the singer name.

When the specific morpheme corresponds to the album searching, the weight of the album name is larger than that of the singer name, and the weight of the singer name is larger than that of the lyric.

It should be understood that, above descriptions about the weight are as follows, the larger the text correlation value in the embodiments of the present invention is, and the higher the sorting will be. Therefore, the above method of multiplying the correlation value respectively with each weight thereof is adopted. Of course, there may be other sorting methods, e.g., a sorting method, in which the smaller the text correlation value is, and the higher the sorting will be, etc. Descriptions about the weight in the following text should not be used for limiting the present invention.

Value factors of each of the music files may include an accessibility factor, which may be determined by a download speed factor and a connectivity rate factor.

The value factors of each of the music files may include at least one of, or any combination of: a song popularity factor, a singer popularity factor, a site factor of a song record, a file size factor, a playing duration factor, a coding rate factor, a credibility factor of corrected data, a song freshness factor, a network protocol factor, a file type correction factor etc.

Each kind of correlation factors currently taken into account, meanings, a mode for affecting the searching results and a value range thereof are provided in the following descriptions.

Persons having ordinary skill in the art may learn that, although some specific correlation factors and calculation modes thereof are listed in the following, this does not limit the protection scope of the present invention. Substantially, descriptions for the specific correlation factors are only exemplary descriptions, instead of exhaustive descriptions.

1. The accessibility factor valid $W_{valid}$, download speed factor $W_{speed}$ and connectivity rate factor $W_{conn}$.

The accessibility factor $W_{valid}$ of the music data record is determined by the download speed factor $W_{speed}$ and the connectivity rate factor $W_{conn}$.

The accessibility factor $W_{valid}$ is roughly mapped into an interval of [1, 100]. The connectivity rate factor $W_{conn}$ has a great effect on the accessibility factor $W_{valid}$. Only when the connectivity rate factor $W_{conn}$ meets certain requirements, the download speed factor $W_{speed}$ may be taken into account. And then the faster the download speed is, and the higher the data record of the music file ranking will be.

The connectivity rate factor $W_{conn}$ may be used as a classification threshold to affect the accessibility factor $W_{valid}$. The download speed may possess several sections. Audition code rate of songs with common a wma format is 32 kbps, that is, audition requirements may be met when the speed is larger than 4 k. Meanwhile, popular audition code rate of the music with a MP3 format is 128 kbps, and this requires the download speed larger than 15 kbps to better meet the audition requirements.

After the download speed reaches a certain value, the increase of the speed will no longer affect the experience of the user. Due to the difference of rates, the download rate may be converted into a relative value, that is, fRelSpeed equals to a value obtained by dividing a download speed of a song by a coding rate of the song.

The value of the download speed factor $W_{speed}$ is obtained by calculating an actual download speed detected by a "reptile", and the value may be different from the download speed of the client of the user.

Besides, the following rules may be taken as correction factors.

If the code rate is smaller than 64 kbps, the relative download speed may be set as audition at best. If the connectivity rate is very low, but the download speed is very high, the effect of the download speed on connectivity rate factor may also be considered.

2. The song popularity factor $W_{pop}$:

The song popularity factor $W_{pop}$ is directly obtained by statistic performed by the "reptile". The song popularity factor $W_{pop}$ requires smoothness, the value range of which is [0~100]. The more popular the song is, the higher the priority of the sorting result of the song record will be. The song popularity factor affects the searching results in a large degree, thus the priority of the weight thereof should also be set as a relatively high value.

3. The singer popularity factor $W_{sin}$.

The singer popularity factor $W_{sin}$ is also obtained by statistic performed by the "reptile". The singer popularity factor $W_{sin}$ requires smoothness, meanwhile value range of which is [0~100]. The more popular the singer is, the higher the priority of the sorting result of the song record will be.

4. The site factor of a song record $W_{sit}$.

For example, sites of song records may be classified into five simple types, and the descending order of priorities thereof is:

1. Sites recommended by editors;
2. Sites with relatively good download and audition effect;
3. Sites with ordinary download and audition effect;
4. Sites with bad download and audition effect; and
5. Sites which are punished and suppressed because of cheating.

The "reptile" is responsible for determining the site types. Values of the $W_{sit}$ of the above five kinds of site types may be set as 100, 70, 50, 30, 10 in sequence, etc.

5. The file size factor $W_{size}$

The length field in the music data record provided by the "reptile" is the actual length of the link file, which is converted into a floating point number around 0~100. The calculation formula is as follows.

$$W_{size}=\lambda(fSize)\times(1+fSize/(20\times1024\times1024));\quad\text{(formula 1)}$$

In the formula, $\lambda$ demonstrates a correction parameter, fSize a file size.

The basic idea of the formula (1) is: defining intervals with different lengths, classifying different data files to different score intervals of different levels according to the differences of the lengths of the data files, and making scores of the different data files in a same score interval possess minor difference according to the differences of file sizes. For files of different music formats, methods for classifying the files into intervals are different, and values of the correction parameter $\lambda$ are also different.

6. The playing duration factor $W_{Len}$:

Processing for the playing duration is similar to that for file size. However, it is unnecessary to differentiate the file data format, the unified calculation formula is as follows.

$$W_{Len}=\lambda(Len)\times+Len/1000)\quad\text{(formula 2)}$$

In the formula, $\lambda$ demonstrates the correction parameter, Len demonstrates playing duration, the unit of the playing duration is second.

7. The coding rate factor $W_{code}$:

If the type of the music file is determined, there is a certain relationship among the duration, rate and the size. Effect of the coding rate factor $W_{code}$ may not be taken into account temporarily in the correlation calculation.

8. The credibility factor of the corrected data $W_{cred}$:

The song record data directly downloaded by the "reptile" may include many incomplete text fields or noise texts. The "reptile" may correct the data and eliminate the noises therein according to attribute fields and related text of the data record file, to make the record more orderly. However, the phenomenon of excessive correction may appear. Thus, a credibility factor is provided for each record, to indicate whether the corrected text is credible. The value interval of the credibility factor is [0, 100], which needs no smoothness.

9. The song freshness factor $W_{prot}$:

The freshness of a song is determined by release time of the album to which the song belongs. The nearer an album is released, the higher the priority for displaying songs in the album is. If a song belongs to multiple albums, the freshness of the song is calculated according to time of the album lately released. The process for calculating freshness is performed by the "reptile".

10. The network protocol factor $W_{prot}$:

Different weights may be assigned for records in the correlation calculation, according to different protocols of the accessed data records. The "reptile" may capture data of two kinds of protocols, which are respectively File Transfer Protocol (FTP) and Hypertext Transfer Protocol (HTTP).

11. The network segment factor $W_{Net}$:

Network segment where the music data locates may also affect the sorting of the results. In the searching results returned for Netcom users, music data located at the network segment of the Netcom be sorted at the preferential locations. In the searching results returned for the telecommunication users, music data located at the network segment of the telecommunication will be sorted at the preferential locations. Here, the correlation calculation is performed without considering the effect factor of the network segment. Obviously, effect generated by the network segment factor may be different according to different deployment of the music searching server.

12. The file type correction factor $\lambda_{type}$:

Importance of the file type correction factor $\lambda_{type}$ is larger than the comprehensive value obtained by calculation according to the other value factors. The values of the file type correction factor $\lambda_{type}$ are different for different data file types, to differentiate types of songs preferentially displayed, and types of songs secondarily displayed.

Values of current file type correction factor $\lambda_{type}$ are as follows.

$$\lambda_{type}=\begin{cases}1.0, & mp3\\0.8, & wma\\0.6, & rm\\0.6, & unknown\\0.5, & swf\\0.3, & ring\\0.02, & lyric\\0.01, & album.\end{cases}\quad\text{(formula 3)}$$

The file type correction factor $\lambda_{type}$ is adopted to differentiate which types of songs are preferentially displayed. Meanwhile, the file type correction factor $\lambda_{type}$ may also be combined with the file size factor, to rank data record the size of which is too large or too small at the bottom of the searching results. For example, the file type factor with a very low value (e.g., 0.05 or 0.1) may be assigned for files, such as mp3 the file size of which is smaller than 1M, wma the file size of which is smaller than 0.5M, and rm the file size of which is smaller than 0.5M, to ensure that music files with too small file size may be ranked at the bottom of the searching results, meanwhile to avoid affecting the experiences of the user. Similarly, the file type factor with a very low value may be assigned for music files, such as mp3, wma and rm, etc. the file size of which is too large, to ensure that music files with too large file size may be ranked at the bottom of the searching results, meanwhile to avoid affecting the experiences of the user.

With reference to the calculation of the text correlation of text data:

Music searching includes two kinds of data, which are respectively song record and lyric record. The song record is a record including a music link URL, the lyric field of which is null. The lyric record does not include music link, and lyric information included in the lyric field of the lyric record does not exceed the maximum length. The text correlation is adopted to describe whether a music data record matches with a searching string. There are four text fields which may be searched out by the music data record, and each of the four text fields has a fixed weight. The four text fields and related weights thereof are as follows in sequence.

| Field name | weight | correlation value |
|---|---|---|
| Song name | $\lambda_{ti}$ | $W_{ti}$ |
| Singer name | $\lambda_{pl}$ | $W_{pl}$ |
| Album name | $\lambda_{co}$ | $W_{co}$ |
| Lyric/brief introduction | $\lambda_{ly}$ | $W_{ly}$ |

That is, the value of the text correlation equals to the product of document type parameter and the maximum one of the products of each text correlation value of each field and the weight thereof. During the lyric searching and the song searching, weight relationships of fields may be different. Thus, different ratios are respectively assigned for field weights of the lyric data and the song data. For example, during the song searching, weight relationship about each field is expected to be as follows, weight of the song name>weight of the singer name>weight of the album name>weight of the lyric contents.

With reference to the song type records, the given weight order is $\lambda_{ti} > \lambda_{pl} > \lambda_{co} \lambda_{ly}$.

During the lyric searching, expected weight relationship about each field is as follows: weight of the song name>weight of the lyric contents>weight of the album name>weight of the singer name.

With reference to the lyric type records, the given weight order is $\lambda_{ti} > \lambda_{ly} > \lambda_{co} > \lambda_{pl}$.

During the album searching, the weight relationship about each field is expected to be as follows, weight of the album name>weight of the singer name>weight of the album introduction.

With reference to the album type records, the given weight order is $\lambda_{co} > \lambda_{pl} > \lambda_{ti}$.

The following formula is adopted when performing the text correlation calculation for given fields:

$$W_i = \sqrt{tf} \times 1/\text{WordNum} \quad \text{(formula 4)}$$

In the above formula, tf demonstrates lyric frequency, WordNum demonstrates lyric number. That is, the text correlation of a given field increases gradually along with the increase of lyric frequency of hit lyrics, and decreases gradually along with the gradual increase of lyric number included in the field (this item may approximately ensure that compared with fuzzy matched results, exactly matched results are preferentially displayed).

With reference to the value correlation calculation, value quality is adopted to describe the comprehensive factor of a value weight of a song record. The value quality is obtained after performing a linear calculation and normalization for the above mentioned value correlation factors, and the value range of which is [0, 1]. The formula is as follows.

$$W_{quality} = \lambda_{type} \Sigma \lambda_i W_i / \text{MAX\_VALUE} \quad \text{(formula 5)}$$

In the above formula, $W_i$ demonstrates all of the value correlation factors, 1)~11) listed above, and $\lambda_i$ demonstrates a corresponding correction coefficient. In the process that the correlation is adjusted, developers or editors may adjust the results of the sorting to provide relatively ideal values, in which MAX_VALUE may be the maximum value.

Block 102: Calculate comprehensive correlation of each of the music files according to the text correlation and the value correlation, and sort the music files according to the comprehensive correlation.

The comprehensive correlation between the specific morpheme and each of the music files may be calculated according to the text correlation between the specific morpheme and each of the music files and the value correlation of the each of music files. And the sorting of the music files regarding the specific morpheme may be performed according to the comprehensive correlation. Alternatively, the comprehensive correlation between the specific phrase or specific expression and each of the music files may be calculated according to text correlation between the specific phrase or specific expression constituted by the specific morpheme and each of the music files and the value correlation of each of the music files. And the sorting of the music files regarding the specific phrase or specific expression may be performed according to the comprehensive correlation.

In the above flow, clustering for songs with same song name, same singer name and same music file type may be further performed. Songs in each cluster may be divided into different levels according to the value correlation of the songs, such that each level may include music files of scheduled number. Thus LevelRank of all the music files may be obtained.

And then the comprehensive value correlation of each music file may be calculated according to the LevelRank and value correlation of each music file, such that the comprehensive value correlation of music files with the same level in different clusters is close, while the comprehensive value correlation of music files with different levels is far from each other.

The comprehensive correlation between the specific morpheme and the each of music files may be calculated according to the text correlation between the specific morpheme and each of the music files and the comprehensive value correlation. The sorting of the music files of the specific morpheme may be performed according to the comprehensive correlation.

Detailed descriptions for the LevelRank are provided in the following.

Analysis regarding the LevelRank is as follows.

The following situations may appear if only taking the above value quality into account. Singer names and song names of some songs are the same, and the value quality of the songs are higher than that of other songs. Thus, dozens or even hundreds searching results ranked in the front of the searching results may be occupied by the "same" songs. Subsequently, number of songs which may be selected by user may be reduced. Thus, embodiments of the present invention have introduced concepts of shallow aggregation and LevelRank. The value quality mentioned above is also relatively referred as QualityRank.

The shallow aggregation refers to a mode for taking songs with same song name, same singer name and same file type as one class. It is supposed that songs belonging to T different aggregations are searched out. It is wished that the relationship between the text weight and the value may be synthetically taken into consideration, to make songs with relatively high quality and belonging to different aggregations be sorted and displayed in an interleaving mode with an interval of two and including aggregations as many as possible in the first several pages of the searching results.

For example, supposing that T different aggregations are T1, T2, T3, . . . Tn in sequence, meanwhile songs in each aggregation are divided into TiS1, TiS2, TiS3, . . . TiSm according to the QualityRank thereof. And then the expected result is that the QualityRank of songs displayed in the first several pages of the searching results is relatively high, meanwhile number of the Ti is also ensured to be large. The aggregation with high quality may include more songs, but not almost all the songs.

With reference to LevelRank, all data records belonging to each aggregation are sorted in a descending order according to QualityRank obtained by calculation. A certain number of (supposing M) Levels may be set, and N songs may be set in each Level. And then the sorted songs in one aggregation may be put in the Levels in sequence, and subsequently a default Level is set. All the songs that can not be accommodated by the preceding Levels may be put in the default Level.

For example, supposing one hundred songs are included in a song aggregation, five Levels are set and two songs may be put in each Level. And then the remaining ninety songs are put in the default Level in sequence. The aggregation is performed, meanwhile the data is put in the Levels, and then a Rank score, called LevelRank, is set for each of the different Levels. The first Level has the largest LevelRank value (e.g., the LevelRank value of the first Level is 1.0), and then the LevelRank value decreases gradually in sequence along with the increase of the Level, for example, the LevelRank value of the second Level is 0.7, the LevelRank value of the third Level is 0.5, . . . , the LevelRank value of last default Level is 0.

The comprehensive value correlation Weight (Num) of a song is a comprehensive value of the LevelRank and the QualityRank.

That is, Weight (Num)=(LevelRank+QualityRank)/2.

$$W_{num}=(W_{level}+W_{quality})/2 \quad \text{(formula 6)}$$

To make songs in one Level of an aggregation be displayed orderly and adjacently in result pages, minor adjustments may be performed on the Weight (Num). When dividing songs of the same aggregation into Levels, LevelRank value and QualityRank value of songs in the same Level are adjusted to be very close, and are adjusted to decrease gradually in the mode of arithmetic sequence. The closeness refers to that, difference of the final weights caused by differences of all the other value correlation factors, is higher by a magnitude than the difference of the arithmetic sequence.

For example, supposing songs of two aggregations may be searched out during one searching, there are 3 songs in the Level of the first class, and the initial QualityRank is 0.984, 0.962, 0.953 in sequence. There are 3 songs in Level 1 of the second class, and the initial QualityRank is 0.972, 0.970, 0.955 in sequence.

The corrected QualityRank is calculated. The first aggregation is 0.98400, 0.98402, 0.98404 in sequence. The second aggregation is 0.97200, 0.97202, 0.97204 in sequence. Thus, the above requirements may be guaranteed.

To ensure the quality of the music, a threshold may be set for each Level, to ensure the principle of "rather go without than have something shoddy" (similar to the lowest admission cut-offs). For example, it is prescribed that the score of the QualityRank with the first level of wma format must be larger than 0.85. If all scores of the QualityRank of the wma format of the song are smaller than 0.85, the first level of the song does not include the wma format, and the song may be put in the second level for sorting.

Embodiments of the present invention also provide a method for searching Internet music files. With reference to the second embodiment, the method includes the following blocks.

Block 1: Calculate text correlation and value correlation of music files.

Block 2: Calculate comprehensive correlation of the music files according to the text correlation and value correlation of the music files, and sort the music files according to the comprehensive correlation.

Block 3: Decompose the searching string inputted by the user into multiple specific morphemes.

Block 4: Calculate the correlation weight regarding the searching string inputted by the user for all the music files, according to correlation weight data of each specific morpheme and the sorting result of the music files, in which the correlation weight should meet the searching requirements of the user.

Block 5: Sorting the music files according to the correlation weight.

Block 6: Return the sorted music files to the user.

Blocks 1 and 2 in the above method are similar with the specific implementing method of the first embodiment, thus descriptions in above first embodiment may be taken as reference. In order to facilitate understanding, detailed descriptions for the second embodiment are provided hereinafter. The formula for calculating correlation regarding single morpheme is as follows.

Calculation for correlation of a single morpheme (including unary morpheme and multi-morpheme) may be finished when the index is established. The calculation formula is the linear combination result of the above text correlation and value correlation, which is as follows.

$$\text{Weight}(q,d)=\lambda_{text}*W_{text}(q,d)+\lambda_{num}*W_{num}; \quad \text{(formula 7)}$$

The final Weight(q, d) is stored in an inverted index as a float. Appropriate functions may be selected to map Weight (q, d) into the interval of (0,255], which can save a large amount of storage space.

The compound correlation weight calculation of a searching string is as follows.

During the music searching, the searching request inputted by the user may be decomposed into an intersection of multiple morpheme searching requests at last. The correlation between the searching string input by the user and specified music data records may be considered as the comprehensive result of the correlation between the single morpheme and the data records. Since searching inputting requirements of the music searching is shorter than that of the webpage searching, and less morphemes are required by the music searching. A simple complex model may be adopted.

As for the query Q, suppose that Q={q1 q2 . . . qn}, n demonstrates number of morphemes obtained by dividing the searching string, d demonstrates data records hit by a searching single morpheme q.

And then finally, the formula for calculating the correlation between data records inputted and specified by the user is as follows.

$$\text{Weight}(Q, d) = 1 \Big/ \sum_{i=1}^{n} (1/\text{Weight}(q_i, d)) \quad \text{(formula 8)}$$

The final hit results will be sorted according to values obtained with the above formula.

Figure 2:
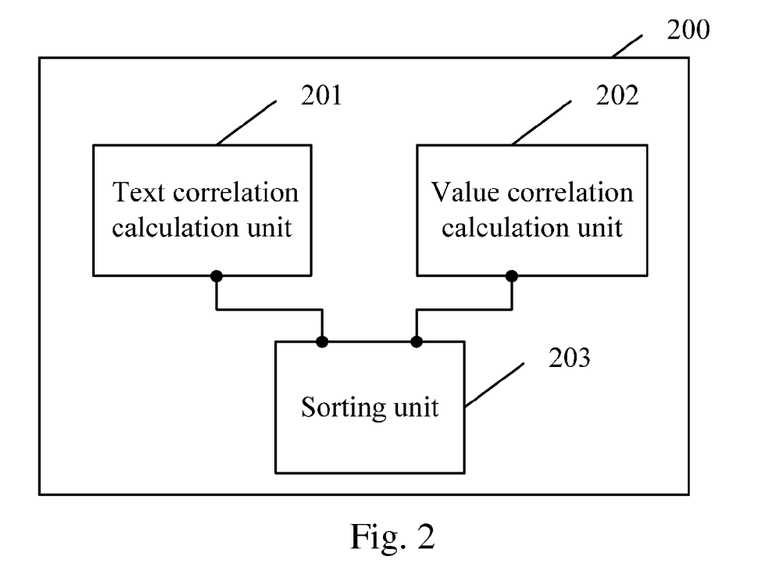
FIG. 2 is a structure schematic diagram illustrating a system for sorting music files in accordance with an exemplary embodiment of the present invention.

FIG. 2 is a schematic diagram illustrating a system for sorting music files in accordance with an exemplary embodiment of the present invention.

As shown in FIG. 2, system 200 includes the following units.

Text correlation calculation unit 201 is adopted to calculate text correlation of each of music files.

The text correlation calculation unit 201 not only may calculate the text correlation between the specific morpheme and each of the music files, according to hit probability of the specific morpheme in text field of the Internet music files, but also may calculate the text correlation between the specific phrase or specific expression and each of the music files, according to hit probability of the specific phrase or specific expression constituted by the specific morpheme in text field of the Internet music files.

Value correlation calculation unit 202 is adopted to calculate value correlation of each of the music files.

The value correlation calculation unit 202 may calculate the value correlation of each of the music files according to a value factor and weight of each of the music files.

Sorting unit 203 is adopted to calculate comprehensive correlation between the specific morpheme and each of the music files, according to the text correlation between the specific morpheme and each of the music files and the value correlation of each of the music files, and sort the music files regarding the specific morpheme according to the comprehensive correlation.

If the specific morpheme forms the specific phrase or specific expression, the sorting unit 203 may calculate the comprehensive correlation between the specific phrase or specific expression and each of the music files, according to the text correlation between the specific phrase or specific expression and each of the music files and the value correlation of each of the music files, and may sort the music files regarding the specific phrase or specific expression according to the comprehensive correlation.

If the specific morpheme does not form the specific phrase or specific expression, the sorting unit 203 may also calculate the comprehensive correlation between the specific morpheme and each of the music files, according to the text correlation between the specific morpheme and each of the music files and the value correlation of each of the music files, and may sort the music files regarding the specific morpheme according to the comprehensive correlation.

The text field may include at least one of, or any combination of the song name, singer name, album name and lyric.

The text correlation calculation unit 201 is adopted to respectively multiply a correlation value between the specific morpheme and the song name, singer name, album name and lyric by a weight to obtain each product, and add each product together to obtain the text correlation value.

Alternatively, the value correlation calculation unit 202 is adopted to respectively multiply a correlation value between the specific morpheme and the song name, singer name, album name and lyric by a weight to obtain each product, add the product together to obtain an intermediate result, and then multiply the intermediate result by a document type coefficient corresponding to the music document type to obtain the text correlation value.

Embodiments of the present invention also provide an engine for searching the Internet music files.

Figure 3:
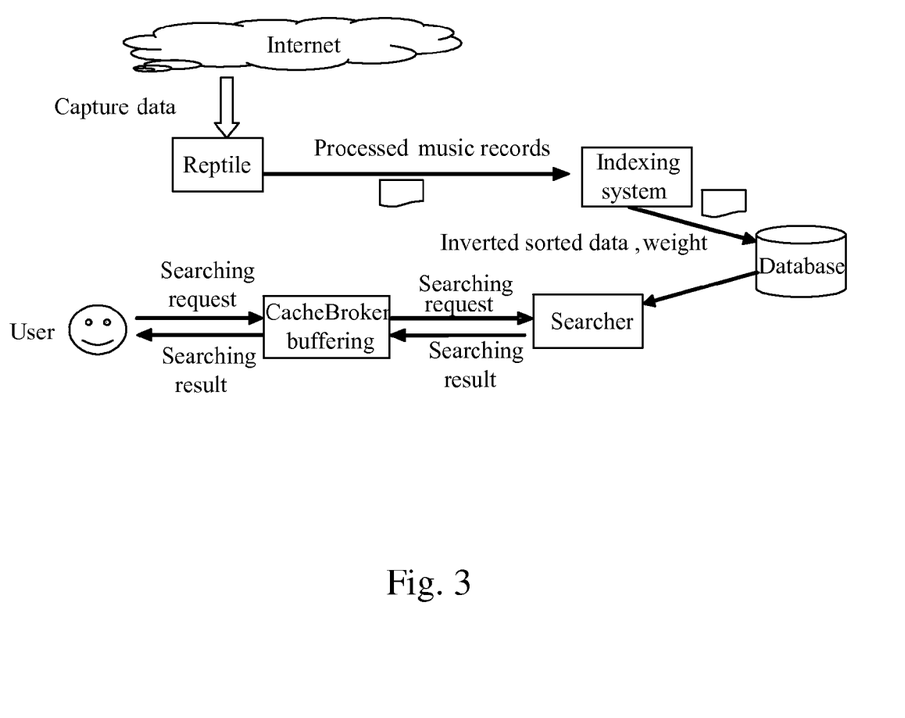
FIG. 3 is a schematic diagram illustrating a music searching engine in accordance with an exemplary embodiment of the present invention.

FIG. 3 is a schematic diagram illustrating a music searching engine in accordance with an exemplary embodiment of the present invention. The music searching engine includes the following units.

A "Reptile" is adapted to obtain Internet music files from the Internet, and send text fields and value factors of the Internet music files to an indexing system.

The "reptile" obtains and analyzes as many as music files of the Internet music files from the Internet. The music files include IDs, URLs of music file data, music names, music sizes, and various attribute factors etc. And then the "reptile" sends the huge amount of music records to the indexing system. Specifically speaking, during obtaining song data by the "reptile", some information related to song data may be obtained. The information is used for calculating a correlation value between a single morpheme and a specified song record, to finally affect the sorting of the searching results of the user. They are all referred to as correlation calculation factors. The "reptile" has mapped values of majority of the correlation factors to the interval of [0, 100]. Besides, the minority of them are initial values of the data. During correlation processing of the indexing system, this part of fields are converted into designated values, which mainly include file size of the song, duration of the song, and file type of the song, etc.

The indexing system is adopted to calculate the text correlation between the specific morpheme and each of the music files, according to hit probability of the specific morpheme in text fields of the Internet music files, calculate the value correlation of each of the music files according to a value factor and weight of each of the music files, calculate the comprehensive correlation between the specific morpheme and each of the music files, according to the text correlation between the specific morpheme and each of the music files and the value correlation of each of the music files, and sort the music files regarding the specific morpheme according to the comprehensive correlation.

The indexing system establishes inverted indexes for all of the music records. And correlation weight between the specific morpheme and each music record is calculated during the process of establishing the indexes. The process is as follows.

The text correlation between the morpheme and the song record is calculated according to hit probability of the morpheme in multiple text fields (the song name, singer name, album name and lyric) and field length. And then, QualityRank of the song record is calculated according to value factors, such as connectivity rate of the song record, file size, singer popularity, song popularity and release time, etc. And then clustering for songs with same <song name, singer name, format> is performed. Songs in each cluster have been divided into different Levels according to value correlation, to ensure that each Level includes two songs, and provide LevelRank of each song. And then the value correlation of each song may be calculated according to the LevelRank and Quality thereof, to make value correlation of songs with same total Levels and belonging to different clusters similar in value, while value correlation of songs in different Levels far from each other. And finally, the comprehensive correlation between the specific morpheme and the song record is calculated according to the text correlation and value correlation.

Searcher is adopted to decompose a searching string inputted by the user into multiple specific morphemes, and calculate all correlation weights between the searching string inputted by user and all the music files meeting the searching requests of the user, according to correlation weight data of each specific morpheme and the sorting result regarding each specific morpheme, and then sort the music files meeting the searching request of the user according to correlation weights, and return the sorted music files to the user.

Specifically, the searcher decomposes the searching string inputted by user into multiple morphemes corresponding to indexes established, reads inverted data of related morphemes and correlation weight data thereof, calculates correlation weights regarding the searching string inputted by user of all the songs meeting the searching request of the user, sorts the result records according to correlation weights thereof, and returns the sorted result records to the user.

The CacheBroker in FIG. 3 is adopted to receive the searching request of the user, forward the request to searcher in background, collect and cache the searching results.

In view of above, in the music searching engine provided by embodiments of the present invention, the "reptile" obtains webpage data relating to music from the Internet, extracts correlation parameters, and submits formatted data to the indexing system. And the indexing system establishes an inverted index for the formatted data. During the process, the indexing system sorts the inverted index data according to a certain method for calculating correlation of the music files.

Embodiments of the present invention also provide a method for performing correlation sorting for the searching results of the music searching engine, taking into account factors, such as text attributes and value attributes of the Internet music files and Internet accessibility, etc.

Hereafter, exemplary descriptions for the present invention are provided in an example of searching for a song "love" by a user.

There are many songs, the music song name (album name) of which includes "love", the name lengths of which may be different. There may be many source links in the Internet for one song of the same singer.

In the embodiments of the present invention, first, different source records of a same song of a same singer are aggregated to one cluster. Each music record may possess many attributes of correlation calculation factors as described in above technical solutions. For example, one music record includes the following information.

Song name: love
Singer name: Xiaohu Dui
Album name: love
File type: mp3
Size: 4.2M
Connectivity rate: 88
Playing duration: 3 minutes 20 seconds
Song popularity: 80
Singer popularity: 85

The QualityRank of the music record may be obtained by performing the calculation process described in the above embodiments with these factor values.

There may be multiple different source link records for the song "love" of Xiaohu Dui. However, values of many correlation factors of the multiple different source link records are different. All of these source link records are aggregated to one cluster. After calculating the QualityRank of each source link record, these source link records are sorted according to the values of QuanlityRank thereof. And then these source links are divided into multiple different Levels. Different LevelRank values may be obtained according to the calculation method of the LevelRank. Subsequently, the value correlation about these source links may be obtained according to the formula of the value correlation. Values of value correlation of the source records in different Levels of a same cluster may be far from each other due to the comprehensive effect of LevelRank and QualityRank.

Similarly, songs, the song names of which include the word "love" may also be aggregated to different clusters. Each cluster is differentiated according to LevelRank. Values of value correlation of records in a same Level of different clusters may be close to each other, such that they will be located adjacently in the finally sorted searching results. That is, in the final searching results, records of the first Level of different clusters may be sorted at the front of the searching results, which not only ensures that songs with good correlation are sorted at the front of the searching results, but also ensure the diversity of songs diversity in the first several pages.

The final sorting result is obtained by synthesizing the text correlation and value correlation. Length information of the song name is also taken into account in the text correlation, trying to sort songs with shorter song names in the front of the searching results. In other words, the more backward the result returned for the searching of the word "love" of the user is, the longer the length of the song will be.

The foregoing descriptions are only preferred embodiments of the present invention and are not used for limiting the protection scope thereof. Any modifications, equivalent substitutions, improvements, etc, made within the spirit and principle of the present invention, are all included in the protection scope of the present invention.

What is claimed is:

1. A method for sorting Internet music files, comprising:
setting a specific morpheme;
calculating a text correlation between each of the music files and the specific morpheme, a specific phrase, or a specific expression formed by the specific morpheme according to hit probability of any one of the specific morpheme, the specific phrase and the specific expression in text fields of Internet music files;
calculating a value correlation of each of the music files according to a value factor and a weight of each of the music files;
calculating comprehensive correlation of each of the music files according to the text correlation and the value correlation; and
sorting the music files according to the comprehensive correlation;
wherein each of the text fields comprises at least one of, or any combination of a song name, a singer name, an album name and lyrics, and calculating the text correlation between the specific morpheme and the music file comprises:
calculating the text correlation between the specific morpheme and each of the music files, according to each weight of the specific morpheme regarding at least one of, or any combination of the song name, singer name, album name and lyrics; or
calculating the text correlation between the specific morpheme and each of the music files according to each weight of the specific morpheme regarding at least one of, or any combination of the song name, singer name, album name and lyrics, and a document type coefficient of a music file type;
wherein the value factor of each of the music files is an accessibility factor, which is determined by a download speed factor and a connectivity rate factor;

wherein calculating comprehensive correlation of each of the music files according to the text correlation and the value correlation, and sorting the music files according to the comprehensive correlation comprises:

performing clustering for songs with a same song name, singer name and music file type, dividing songs in each cluster into different Levels according to the value correlation of each of the songs, setting music files of predetermined number in each Level, and obtaining LevelRank of all the music files;

calculating the comprehensive value correlation of each of the music files according to the LevelRank and the value correlation of each of the music files, making the comprehensive value correlation of music files in a same Level of different clusters be close to each other, and making the comprehensive value correlation of music files in different Levels be far from each other;

calculating the comprehensive correlation between the specific morpheme and each of the music files, according to the text correlation between the specific morpheme and each of the music files and the comprehensive value correlation, and sorting the music files regarding the specific morpheme according to the comprehensive correlation.

2. The method according to claim 1, comprising:
when the specific morpheme corresponds to song searching, a weight of the song name is larger than that of the singer name, a weight of the singer name is larger than that of the album name, a weight of the album name is larger than that of the lyrics;
when the specific morpheme corresponds to lyric searching, the weight of the song name is larger than that of the lyrics, the weight of the lyrics is larger than that of the album name, the weight of the album name is larger than that of the singer name; and
when the specific morpheme corresponds to album searching, the weight of the album name is larger than that of the singer name, the weight of the singer name is larger than that of the lyrics.

3. The method according to claim 1, wherein the value factor of the music file comprises at least one of, or any combination of:
a song popularity factor, a singer popularity factor, a site factor of a song record, a file size factor, a playing duration factor, a coding rate factor, a credibility factor of corrected data, a song freshness factor, a network protocol factor, and a file type correction factor.

4. A method for searching Internet music files, comprising:
setting a specific morpheme;
calculating a text correlation between each of the music files and the specific morpheme, a specific phrase, or a specific expression formed by the specific morpheme according to hit probability of any one of the specific morpheme, the specific phrase and the specific expression in text fields of Internet music files;
calculating a value correlation of each of the music files according to a value factor and a weight of each of the music files;
calculating comprehensive correlation of each of the music files according to the text correlation and the value correlation, and
sorting the music files according to the comprehensive correlation;
decomposing a searching string inputted by a user into multiple morphemes or phrases or expressions;
calculating correlation weights regarding the searching string inputted by the user for all music files meeting a searching request of the user, according to correlation weight data of each of the morphemes, the phrases or the expressions and sorting result of the music files;
sorting the music files according to the correlation weights; and
returning the sorted music files to the user.

5. The method according to claim 4, wherein each of the text fields comprises at least one of, or any combination of a song name, a singer name, an album name and lyrics, and calculating the text correlation between the specific morpheme and the music file comprises:
calculating the text correlation between the specific morpheme and each of the music files, according to each weight of the specific morpheme regarding at least one of, or any combination of the song name, singer name, album name and lyrics; or
calculating the text correlation between the specific morpheme and each of the music files according to each weight of the specific morpheme regarding at least one of, or any combination of the song name, singer name, album name and lyrics, and a document type coefficient of a music file type.

6. The method according to claim 4, wherein calculating comprehensive correlation of each of the music files according to the text correlation and the value correlation, and sorting the music files according to the comprehensive correlation comprises:
performing clustering for songs with a same song name, singer name and music file type, dividing songs in each cluster into different Levels according to the value correlation of each of the songs, setting music files of predetermined number in each Level, and obtaining LevelRank of all the music files;
calculating comprehensive value correlation of each of the music files according to the LevelRank and the value correlation of each of the music files, making the comprehensive value correlation of music files in a same Level of different clusters be close to each other, and making the comprehensive value correlation of music files in different Levels be far from each other;
calculating the comprehensive correlation between the specific morpheme and each of the music files, according to the text correlation between the specific morpheme and each of the music files and the comprehensive value correlation, and
sorting the music files regarding the specific morpheme according to the comprehensive correlation.

7. A system for sorting Internet music files, comprising:
a computer processor and memory;
a text correlation calculation unit, to calculate text correlation between each of music files and any one of the specific morpheme, a specific phrase and a specific expression formed by the specific morpheme according to hit probability of any one of the specific morpheme, the specific phrase and the specific expression in text fields of Internet music files;
a value correlation calculation unit, to calculate value correlation of each of the music files according to a value factor of each of the music files and a weight of the value factor;
a sorting unit, to calculation comprehensive correlation of each of the music files according to the text correlation and the value correlation of each of the music files, and sort the music files according to the comprehensive correlation wherein each of the text fields comprises at least one of, or any combination of a song name, a singer name, an album name and lyrics, and the text correlation calculation unit is further to calculate the text correlation between the specific morpheme and each of the music files, according to each weight of the specific morpheme regarding at least one of, or any combination of the song name, singer name, album name and lyrics; or the text correlation calculation unit is to calculate the text correlation between the specific morpheme and each of the music files, according to each weight of the specific morpheme regarding at least one of, or any combination of the song name, singer name, album name and lyrics and a document type coefficient of a music file type.

8. An engine for searching Internet music files, comprising:

a computer processor and memory;

a web crawler, to obtain Internet music files from the Internet, and send text fields and value factors of the Internet music files to an indexing system;

the indexing system, to calculate text correlation between a specific morpheme and each of the music files, according to hit probability of the specific morpheme in the text fields of the Internet music files, calculate value correlation of each of the music files according to the value factor and weight of each of the music files, calculate comprehensive correlation between the specific morpheme and each of the music files, according to the text correlation between the specific morpheme and each of the music files and the value correlation of each of the music files, and sort the music files regarding the specific morpheme according to the comprehensive correlation;

a searcher, to decompose a searching string inputted by a user into multiple specific morphemes, calculate correlation weights regarding the searching string inputted by the user for all music files meeting a searching request of the user, according to correlation weight data of each specific morpheme and sorting result regarding each specific morpheme, and sort the music files meeting the searching request of the user according to the correlation weights, and return the sorted music files to the user, wherein the indexing system is further to perform clustering for songs with a same song name, singer name and music file type, divide songs in each cluster into different Levels according to the value correlation of each of the songs, set music files of predetermined number in each Level, and obtain LevelRank of all the music files; and the indexing system is further to calculate comprehensive value correlation of each of the music files according to the LevelRank and the value correlation of each of the music files, make the comprehensive value correlation of music files in a same Level of different clusters be close to each other, and make the comprehensive value correlation of music files in different Levels be far from each other, calculate the comprehensive correlation between the specific morpheme and each of the music files, according to the text correlation between the specific morpheme and each of the music files and the comprehensive value correlation, and sort the music files regarding the specific morpheme according to the comprehensive correlation.

* * * * *